Figure 1:
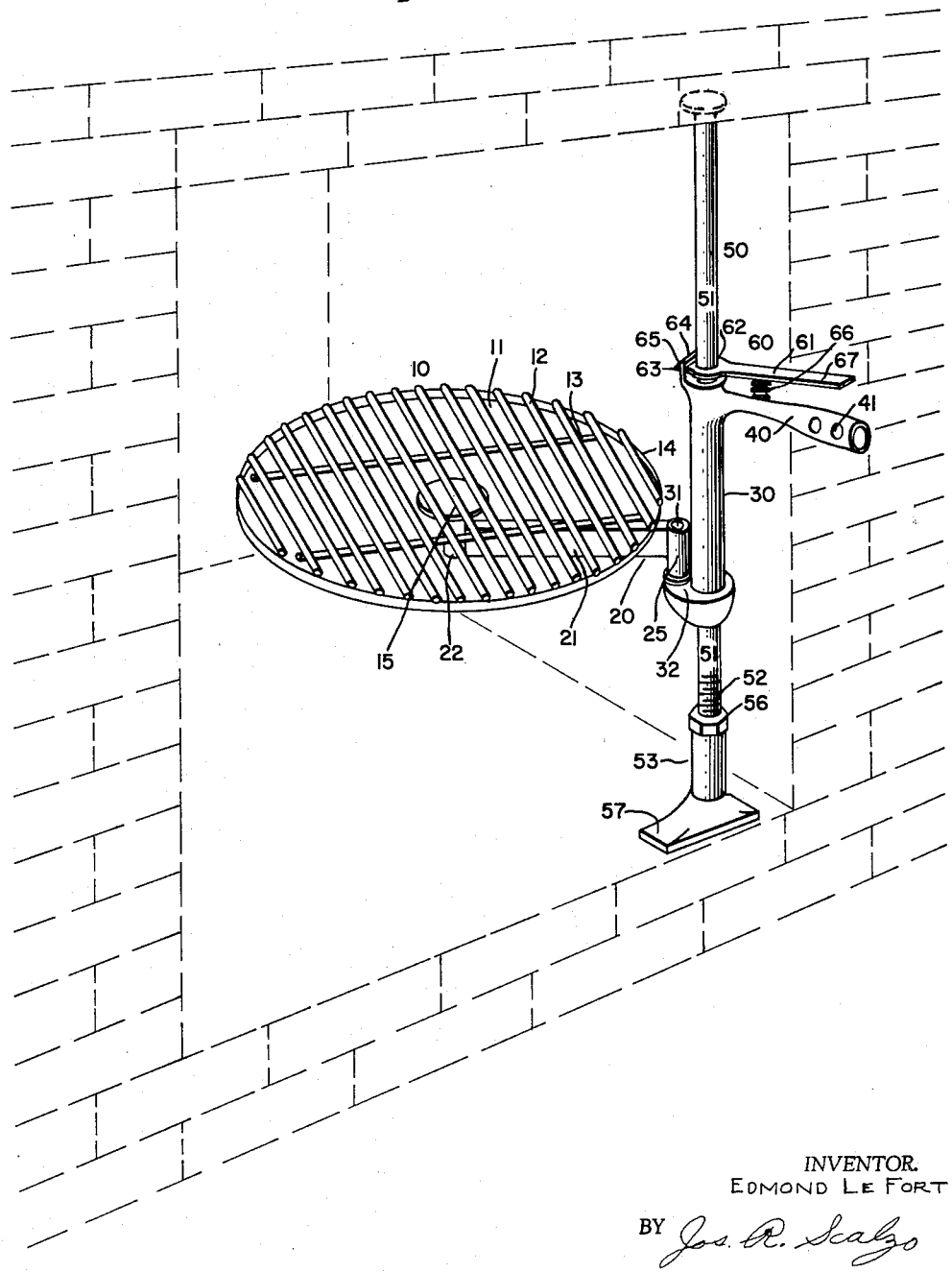

Nov. 19, 1963 E. LE FORT 3,111,123
ADJUSTABLE FIREPLACE GRILL
Filed Feb. 15, 1963 2 Sheets-Sheet 1

INVENTOR.
EDMOND LE FORT
BY *Jos. R. Scalzo*
ATTORNY

Nov. 19, 1963 E. LE FORT 3,111,123
ADJUSTABLE FIREPLACE GRILL
Filed Feb. 15, 1963 2 Sheets-Sheet 2

INVENTOR.
EDMOND LE FORT
BY *Jos. R. Scalzo*
ATTORNY

United States Patent Office 3,111,123
Patented Nov. 19, 1963

3,111,123
ADJUSTABLE FIREPLACE GRILL
Edmond Le Fort, 2452 Eastmoreland Drive,
Oregon, Ohio
Filed Feb. 15, 1963, Ser. No. 258,851
2 Claims. (Cl. 126—137)

The present invention relates to a cooking grill and more particularly to a removable, adjustable, swinging, rotating fireplace grill, that can be easily assembled, quickly installed to operate in almost all conventional home fireplaces or just as easily be dismantled and removed for compact storage. It also can be used as a convenient cooking grill over open fires out-of-doors.

In general the fireplace grill of the present invention consists essentially of a rotating grid rotatably connected to one end of a swinging grid arm that is in turn connected at its other end to a vertical moving adjustment piece that smoothly and easily can be adjusted up or down by means of a ball-bearing contact with a vertical fireplace shaft, with the vertical adjustment piece having a positive locking device that can be easily released for vertical movement and instantly locked to hold the grid in at a desired elevation, and a self-cooling handle to permit easy lifting or turning of the vertical adjustment piece, hence, at the same time turn the grid, grid swinging arm and vertical adjustment piece. The vertical fireplace shaft is constructed to permit adjustment of its overall length so as to fit in any fireplace and to be rigidly maintained in a vertical position in the fireplace by having its top and bottom surfaces exerting pressure by abutment against the floor and ceiling of the fireplace. The refinements that make the present invention a most important and useful improvement in fireplace grills will hereinafter be described.

An object of the present invention is to construct a fireplace cooking grill that is relatively simple to assemble and install, and one that will fit in almost all normal home fireplaces.

Another object of the present invention is to make a completely adjustable fireplace grill in which the grill cooking grid can be independently rotated for even cooking and will permit the grill cooking grid to be swung in or out of the fire or fireplace. A more important object is to construct a fireplace grill that will permit easy, instant and smooth vertical adjustment of the grill cooking grid by means of light hand gripping pressure exerted on an air cooled handle to permit varying the grid's height above the fire during cooking, while permitting instant and positive locking of the grill grid at any desired height as well as easy and instant release of the locking device to permit changing the height of the grill grid when desired and when in cooking use.

Still another important object of this invention is to construct a fireplace grill that is easy to dismantle as well as easy to assemble, and is easily and compactly carried or stored, as well as one that can be made either a temporary or, which is more preferred, a permanent and useful part of the home fireplace.

Still another object is to make a grill that is portable and readily adaptable for outside as well as inside use, particularly over open fires.

A further important object is to be able to provide all the aforementioned benefits in a grill and still be able to construct the entire ensemble cheaply for economical purchase and efficient use by all fireplace users, as it represents not only a luxury but a healthful and practical addition to any home with a fireplace and can also be useful to any person who cooks over open outdoor fires.

A still further object is to construct a fireplace grill that has all the aforementioned features and still is attractive and ornamental in appearance so that it enhances the natural beauty of home fireplaces.

These and many other beneficial objectives will become apparent in the following description.

Figure 2:
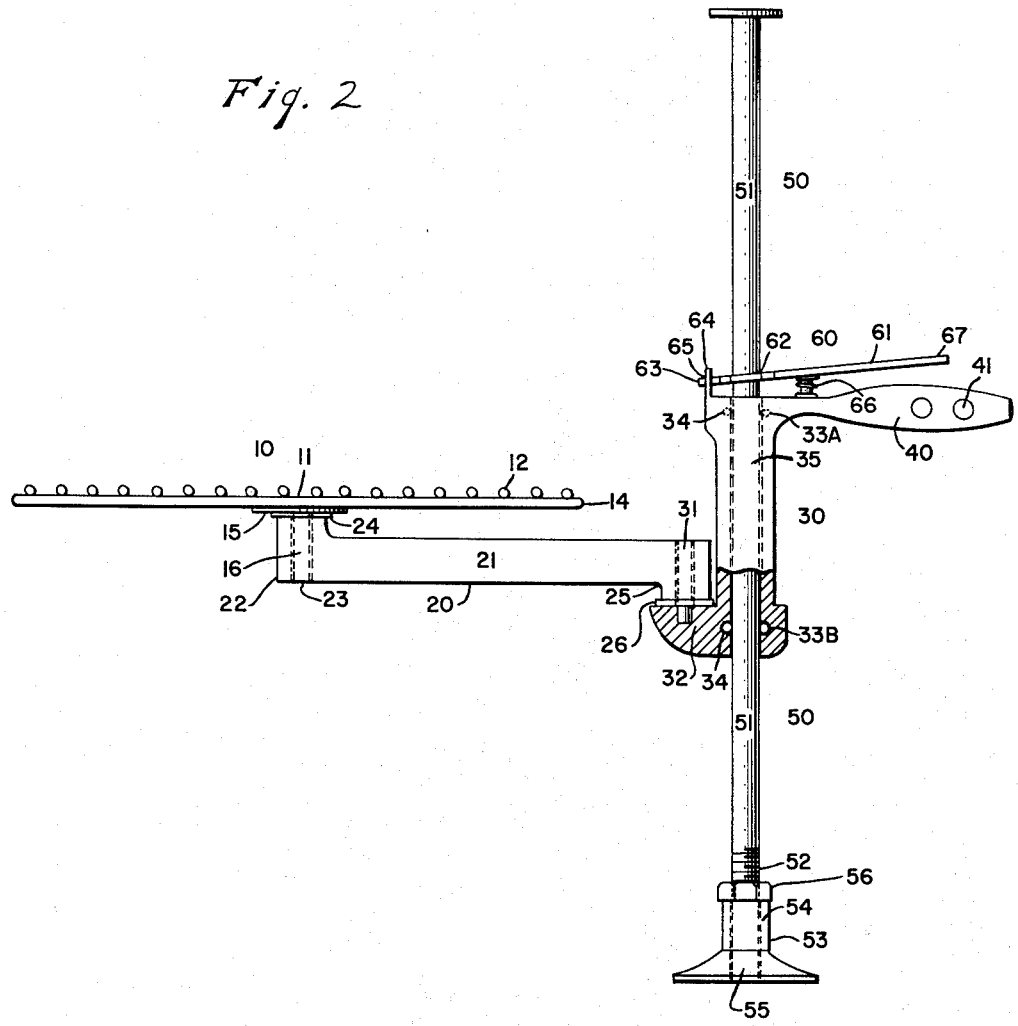

In the enclosed drawings forming an integral part of this application:

FIGURE 1 is a perspective view of the entire fireplace grill ensemble in place in a fireplace, FIGURE 2 is a side elevation of the grill with some parts cut away for better reference.

Now referring to the drawings you will see that the grill cooking grid 10 is mounted on grill swinging arm 20 which in turn is connected to the vertical adjustment piece 30 which can be smoothly moved up and down by means of handle 40 on the adjustable vertical fireplace shaft 50 by means of ball bearings being incorporated within the vertical adjusting piece and has a positive locking device 60 to instantly and permanently hold the grid assembly at any desired height and that can be readily released for permitting vertical movement of the vertical adjusting piece 30.

Now in more detail we see that the grill cooking grid portion designated in general by numeral 10 consists of a grid portion 11 with closely spaced rods 12 for supporting the food or container to be heated or cooked. In the preferred embodiment of the grill portion 10 you will note that the grill cooking grid 11 is circular and that the main rods 12 are parallel with dual supporting bars 13 for under-bracing for strength and rigidity of the cooking grid. The parallel rods are spaced closely together so that steaks or hamburgers or the like can be placed on them for cooking as well as small or large cooking utensils or containers.

The rods are connected to an outer circular rim 14 forming a rigid one piece circular cooking grid.

The center flange 15, integral with and rigidly connected to the underside of the grid rods 12 in the center of the grid is sized so as to support the entire grid with food and utensils placed on any portion of the grid. A cylindrical center post 16 integral with and extending downward from the flange 15 is sized so that it fits in and rests upon one end of a grill swing arm 20 and fits snugly within the circular bore 23 of the swing arm 20.

The grill swing arm 20 consists of an elongated horizontal arm piece 21 substantially longer than the radius of the grill portion 10. At one end of the horizontal arm piece is a grill receiving piece 22 which had a cylindrical post receiving bore 23 for snugly receiving the grill center post 16 which rotates within the bore 23. The grill center post 16 fits snugly within the cylindrical bore 23 of the swing arm 20 and permits easy rotation of the entire grill portion so that any food or utensil cooking on the grid can be rotated. Also the grill portion 10 can be lifted from the swing arm portion 20 with ease. Further, the post extension 16 and the cylindrical bore 23 of the swing arm 20 is long enough to provide a positive stabilizing force to prevent tilting of the grill when weight is applied to the grill by food or utensils on any portion of the grid 11.

The grill receiving piece 22 containing the cylindrical bore 23 is flanged at its upper end portion 24 so that the grid center flange 15 can rotate on it; hence, the entire weight of the grill portion 10 will be carried on this swing arm grill receiving piece upper end flanged portion 24.

The other end of the swinging arm 20 also has a receiving piece 25 with a cylindrical bore for receiving the upwardly extending centering post 31 of the vertical adjusting piece 30, thus to maintain the swinging arm 20 in a horizontal position. The lower end portion of the receiving piece 25 also is flanged 26, similarly to 24, so as to abut against and rotate on the flanged extension 32 of the vertical adjusting piece 30. The receiving arm 20 is thus constructed to be removable from both the grill 10 and the vertical adjusting piece 30 as the grill may be merely lifted from the swinging arm portion 20 to separate these to portion and the swing arm portion lifted from the vertical adjustment piece portion 30 to separate these to portions. The only means of connecting the grill portion 10 and the vertical adjustment piece 30 to the swing arm portion 20 is by the grill post 16 and vertical adjustment piece post 31 which are received in the two swing arm cylindrical bores 23 and 26. The end portions 22 and 25 of the swing arm 20 are alike in construction so that either end portion may be used to support the grill for easy assembling.

The vertical adjustment piece 30 consists essentially of casting with a central cylindrical bore 35 through its entire length to receive and snugly fit the tubular vertical fireplace shaft 50. The casting also has upper and lower bearing races 33A and 33B for inserting ball bearing 34 so that the vertical adjustment piece 30 will slide smoothly and evenly along the fireplace shaft 50. While other bearing designs may be used, the one preferred is to have the races 33A and 33B cast into the original casting of the vertical adjusting piece 30 and for several ball bearings 34 to be inserted and then held in place by the contact with the vertical fireplace 40.

The vertical adjustment piece as already described has on its lower end portion a flanged extension 32 which has the centering post 31 extending upwardly therefrom to connect with the swing arm portion 20.

A handle portion 40 integral with and protruding from the upper end portion of the vertical adjustment piece 30 is provided for easy gripping and maneuvering of the adjustment piece 30. The handle 40 is made long enough to insure its extending far enough out beyond the fireplace and away from the fire and heat for comfortable gripping. In the preferred embodiment the handle is provided with air holes 41 for self cooling.

The locking device 60 consists essentially of an elongated flat metal bar 61 that has an aperture 62 provided near one end through which the vertical fireplace shaft 50 extends. The aperture 62 is sized to be slightly larger than the fireplace shaft 50. At one end of the metal bar 61 is provided a tooth extension 63 of smaller width than the bar 61. Tooth 63 is received in a tooth holder 64 provided with aperture 65 of essentially the same dimensions as the tooth 63. The tooth holder 64 is integral with and extends upwardly from the top of the vertical adjustment piece 30. The tooth holder is located on the adjustment piece 30 on the opposite side from the handle 40. The flat metal bar 61 extends substantially along and above the handle so that hand gripping the handle 40 will also permit hand gripping the metal bar 61.

To provide a locking device with positive action that can readily be released, a lift spring 66 is provided beneath the locking metal bar 61, between the underside of bar 61 and the upper side of handle 40 to which it is attached. Thus by having the handle end 67 of the locking metal bar 61 free for limited vertical movement, and the other end, the tooth end 63, held in the tooth holder extension flange 64, the action of the spring 66 pressing upwardly against the handle portion of the locking metal bar causes an instantaneous bind of the bar 61 on the fireplace shaft 50 whenever the bar is permitted to elevate at its free end enough to cause the shaft to bind against the periphery of the shaft aperture 62. As soon as the bar 61 is pressed down to free the bind, the adjustment piece 30 may be vertically moved, easily and quickly.

The vertical fireplace shaft 50 consists of the tubular shaft 51 which is slightly less in overall length than the interior height of the fireplace. The shaft 51 is made adjustable in order to fit securely within a fireplace and act as the sole means for carrying the weight of the grill 10, swing arm 20 and adjustment piece 30. The adjustability of shaft 51 is brought about by having its lower end portion 52 threaded and this threaded end portion 52 received in a flanged base section 53. The base section 53 consists of an expanded section 54 that is larger in diameter than the shaft 51 so that the shaft 51 can pass through the smooth open channel or bore 55 within the base 53. The flanged lower end 57 of the base 53 is designed to give greater stability to the entire fireplace shaft ensemble 50 as it represents the contact of the fireplace shaft 50 with the fireplace floor.

The adjustability is obtained by means of a nut 56 screwed on to the threaded shaft portion 52 and abutting against the top of base 53 so that when the nut 56 is screwed up or down on the threaded portion 52 of shaft 51, the shaft 51 will move up or down and thus adjust to the desired fireplace height. The only limit of adjustability is the overall length of the base 53, as the shaft is free to move up and down within the smooth bore 55 which extends the entire length of the base 53.

Because of the adjustability of the vertical fireplace shaft 50 in particular, the entire fireplace grill ensemble can be used out of doors over open fire by merely removing the base 53 from the shaft 51 and driving the shaft 51 deep into the ground, sufficient to carry the weight of the grill and cooking material. Also when used outside a larger base 53 can be provided to give added stability and holes be provided in the larger base so as to drive a stake through the hole and into the ground to secure the base and, hence, the entire ensemble from tilting when in use.

This and other important and necessary uses can be ascribed to the adjustable fireplace grill of the present invention. However, what has been described should suffice to illustrate the more important features and justify as well as prove the utility and novelty of the present invention.

Having thus described the present invention which can be varied and still come within the purview of this invention, the following is claimed:

1. In a device of the class described, a grill portion consisting of a grid, a tubular post integral with and extending downwardly from the underside of said grid; a vertical adjustment piece consisting of a casting, said casting being provided with a central shaft receiving tubular bore throughout its entire length, ball-bearing races with ball-bearings provided around the upper and lower end portions of said casting tubular bore, a flange extension from said casting, and a tubular post integral with and extending upwardly from said casting flange extension; a swing arm for connecting said casting to said grid, and said swing arm consisting of a horizontal arm section substantially longer in length than the radius of said grid, a tubular receiving bore in each of the opposite end portions of said swing arm, one of said receiving bores to snugly receive said grid post and the other of said receiving bores to snugly receive said casting flange extension post; an elongated protruding handle portion integral with and extending from said casting; a tubular shaft disposed within said shaft receiving bore of said casting and said tubular shaft making slidable bearing contact with said ball-bearings within said casting for smooth and easy vertical movement of said casting on said shaft, a flanged top portion on said shaft, a threaded lower end portion on said shaft, a turn nut screwed on said threaded portion of said shaft; a base casting provided with a flanged bottom portion and a smooth center tubular bore throughout its entire length for slidably receiving said threaded portion of said shaft, and the height of said tubular shaft being adjusted vertically by turning or loosening said threaded nut against the top flanged surface of said base casting, a releasable locking device on said adjustment piece consisting of an elongated flat metal bar, one end portion of said metal bar being a hand gripping portion and disposed above and along said hand portion of said casting, the opposite end portion of said metal bar terminating in a protruding tooth extension of substantially narrower width than said metal bar, said metal bar having a shaft receiving circular aperture near its toothed end portion for receiving said vertical tubular shaft, a tooth receiving bracket extending upwardly from the top of said adjustment casting into which said tooth extension of said metal bar loosely fits and said tooth receiving bracket being located on the opposite side of said adjustment casting from said handle; a compression spring disposed between said metal bar gripping portion and said handle for urging said metal bar gripping portion upward and out of horizontal thus causing a bind of the periphery of said metal bar aperture on said vertical shaft that can only be released by a depression of said metal bar gripping portion to a horizontal or out-of-contact position.

2. In a fireplace of the class described, comprising a vertical tubular shaft of adjustable length for abutting against the floor and ceiling of a fireplace, a vertical adjustment piece for vertical slidable movement up and down said tubular shaft, a protruding handle extending from said vertical adjustment piece, a locking bar for locking and holding in place said adjustment piece at varied desired heights on said tubular shaft, a swinging arm rotatably connected at one end portion to said adjustment piece, a grid rotatably connected to the other end portion of said swinging arm, and said grid being removable from said swinging arm and said swinging arm being removable from said adjustment piece; said adjustment piece comprising a casing with a center cylindrical bore for receiving said tubular shaft, ball bearing inserts at the upper and lower end portions of said central bore for permitting smooth ball bearing slidable contact of said adjustment piece with said tubular shaft; said locking bar comprising a central shaft receiving section having an aperture of substantially the same diameter as said tubular shaft and through which said tubular shaft is disposed, a handle portion on one end portion of said locking bar extending along and above said adjustment piece protruding handle, a toothed extension protruding from the opposite end portion from said handle end portion on said locking bar, a receiving holder on said adjustment piece for receiving said toothed extension to hold said toothed extension in place, a compression spring disposed between said lock bar handle portion and said adjustment piece handle urging said lock bar handle away from said adjustment piece handle thus elevating one side of said locking bar shaft receiving aperture causing said locking bar to bind against said tubular shaft for locking or holding purposes, and when said compression spring is compressed by urging said locking bar handle and said adjustment piece handle together so that the bind on said shaft by said locking bar is released, said adjustment piece can be slidably moved up and down on said tubular shaft.

References Cited in the file of this patent

UNITED STATES PATENTS

| | | |
|---|---|---|
| 742,210 | Moreland | Oct. 27, 1903 |
| 2,522,223 | Hardin et al. | Sept. 12, 1950 |
| 2,523,200 | Durst | Sept. 19, 1950 |
| 2,960,979 | Stone | Nov. 22, 1960 |

FOREIGN PATENTS

| | | |
|---|---|---|
| 131,526 | Great Britain | Aug. 28, 1919 |